United States Patent
Lee et al.

(10) Patent No.: US 11,563,633 B2
(45) Date of Patent: Jan. 24, 2023

(54) VIRTUAL NETWORK FUNCTION DESCRIPTOR GENERATOR

(71) Applicant: MICROSOFT TECHNOLOGY LICENSING, LLC, Redmond, WA (US)

(72) Inventors: Andrew Lee, Enfield (GB); James Duncan Parsons, Enfield (GB); Andrew Munro Caldwell, Enfield (GB); David Charles Hotham, Enfield (GB); Michael André Duppré, London (GB); Philip Joel Davies, Southwold (GB); Joseph Ellis Darracott Powell, London (GB)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 17/244,924

(22) Filed: Apr. 29, 2021

(65) Prior Publication Data

US 2022/0353140 A1    Nov. 3, 2022

(51) Int. Cl.
*H04L 41/0816* (2022.01)
*H04L 41/0853* (2022.01)
*G06F 9/455* (2018.01)
*H04L 41/04* (2022.01)
*H04L 12/46* (2006.01)

(52) U.S. Cl.
CPC ...... *H04L 41/0816* (2013.01); *G06F 9/45558* (2013.01); *H04L 41/04* (2013.01); *H04L 41/0853* (2013.01); *G06F 2009/45595* (2013.01); *H04L 12/4675* (2013.01)

(58) Field of Classification Search
None
See application file for complete search history.

(56) References Cited

U.S. PATENT DOCUMENTS 11,018,899 B1 *   5/2021   Melkild ............... G06F 8/60
2016/0328259 A1 * 11/2016   Xia ..................... H04L 41/40

FOREIGN PATENT DOCUMENTS

KR         102199208 B1 *  1/2021   ......... H04L 41/0803

* cited by examiner

*Primary Examiner* — Scott B Christensen
(74) *Attorney, Agent, or Firm* — Newport IP, LLC; Han K. Gim

(57) ABSTRACT

Techniques are described for generating a virtualized network function (VNF) descriptor (VNFD) indicative of resources for managing VNF components (VNFCs) across a plurality of virtualized infrastructure managers (VIMs) implemented in a virtualized computing environment configured in a user-specific configuration. A VNFD generator receives a solution description file (SDF) encoding user input pertaining to the user-specific configuration, and a VNFC descriptor encoding VNFC specific information. The SDF and VNFC descriptor are validated and translated to generate an abstracted VNFD that is independent of renderers implemented at the virtualized computing environment. The abstracted VNFD is translated to a VNFD that is specific to the renderers and VIM and VNFD-specific information at the virtualized computing environment.

20 Claims, 7 Drawing Sheets

VIRTUAL NETWORK FUNCTION DESCRIPTOR GENERATOR

BACKGROUND

Service providers can provide computing services to businesses and individuals as a remote computing service or provide "software as a service" (e.g., cloud computing). In some cases, users may deploy products and services from service providers on their own premises. When deploying and managing resources, such as virtualized resources, in a customer computing environment, various issues may arise, resulting in deployment delays which in turn can prevent the customer from providing services to their downstream users. This can lead to lost revenue and customer dissatisfaction. Production loss and inefficiencies with respect to computing resources can be exacerbated when configuration issues arise and the service provider is unable to quickly isolate and correct the cause of a misconfiguration issue.

It is with respect to these considerations and others that the disclosure made herein is presented.

SUMMARY

The disclosed embodiments describe technologies for efficiently describing and creating various resources relating to management of virtualized network function components (VNFCs) running across various virtualized infrastructure managers (VIMs). The technologies provide a way that avoids the need to create for each VNFC and for each VIM a separate document or file for describing and creating the resources. Furthermore, complex VNFCs can be deployed in a further number of modes, and it is desirable to avoid the creation of VNFDs becoming a problem of creating and managing $2^{\wedge}$(number of nodes)*(number of VIMs)*(number of VNFCs) different VNFDs.

The described techniques can allow for a service provider or customer to more efficiently deploy and manage computing resources while maintaining efficient use of computing capacity such as processor cycles, memory, network bandwidth, and power.

This Summary is provided to introduce a selection of concepts in a simplified form that are further described below in the Detailed Description. This Summary is not intended to limit the scope of the claimed subject matter.

DRAWINGS

The Detailed Description is described with reference to the accompanying figures. In the description detailed herein, references are made to the accompanying drawings that form a part hereof, and that show, by way of illustration, specific embodiments or examples. The drawings herein are not drawn to scale. Like numerals represent like elements throughout the several figures.

DETAILED DESCRIPTION

Figure 1:
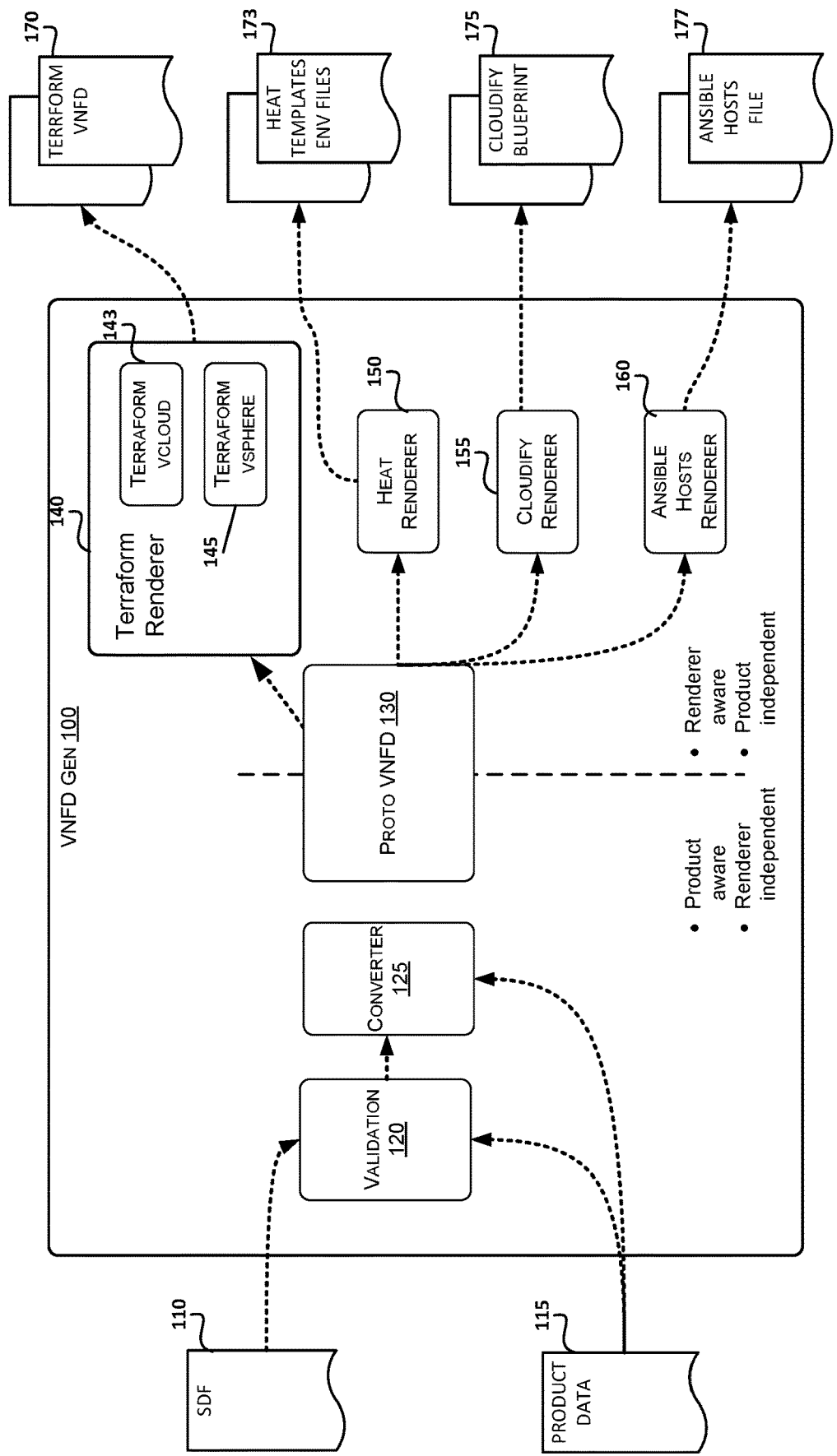
FIG. 1 is a diagram illustrating an example architecture in accordance with the present disclosure.

The disclosed embodiments describe technologies for efficiently describing and creating various resources relating to management of virtualized network function components (VNFCs) running across various virtualized infrastructure managers (VIMs).

A virtualized network function (VNF) descriptor (VNFD) is an artefact that can be used to enable orchestration relating to management of various VNFCs across various VIMs. A VNFD may be created in the form of a text file and may be used to describe a particular VNF's deployment and operational instructions. Examples of VNFD modelling languages include OpenStack/Heat Orchestration Template (HOT), terraform files, and OASIS TOSCA. There is a lack of standardization of the VNFD modelling languages.

VNFD formats are in general, tied to a particular VIM, so if it is desired to support deployment on multiple VIMs, it is necessary to create VNFDs, one per VNFC, per VIM. Currently, efforts to standardize VNFD formats across VIMs have not yielded results at a sufficient level of abstraction that avoids the need to create, manage, and maintain a separate VNFD per VNFC per VIM.

Furthermore, customer choices for their networks such as incorporation of security groups, number and configuration of virtual networks, or whether to deploy a Session Border Controller as a high-availability pair or standalone can be difficult to express in some VNFDs. This may result in the creation of multiple VNFDs for each customer choice, or manual customization of VNFD for each environment.

Generally, telephony applications such as Session Border Controllers are by design flexible in the ways they can deployed and are therefore not amendable to be modelled cleanly in a VNFD modeling language, such as TOSCA or Heat. Heat for, example, provides a basic level of parameterization, e.g., environment variables can be specified separately from the template. However, some versions of Heat do not allow for resources, such as security groups, extra ports, or extra data volumes to be conditionally created on the basis of a parameter. Furthermore, some VNFDs, such as Heat, are not capable of providing a rich validation of inputs. While they can generally validate items as strings or numbers, they cannot, for example, validate a list of IP: port combinations.

The disclosed embodiments address the shortcomings of current methods by providing the described level of complexity in a single VNFD. While the examples herein are described with reference to virtual machines, it should be understood that other embodiments may include other types of virtualized components while implementing the described techniques. Additionally, the disclosed embodiments may be applied to performance of upgrades of clusters across multiple cloud deployments.

In some embodiments, the present disclosure may be implemented in a mobile edge computing (MEC) environment implemented in conjunction with a 4G, 5G, or other cellular network. MEC is a type of edge computing that uses cellular networks and 5G and enables a data center to extend cloud services to local deployments using a distributed architecture that provide federated options for local and remote data and control management. MEC architectures may be implemented at cellular base stations or other edge nodes and enable operators to host content closer to the edge of the network, delivering high-bandwidth, low-latency applications to end users. For example, the cloud provider's footprint may be co-located at a carrier site (e.g., carrier data center), allowing for the edge infrastructure and applications to run closer to the end user via the 5G network.

Referring to the appended drawings, in which like numerals represent like elements throughout the several FIGURES, aspects of various technologies for remote management of computing resources will be described. In the following detailed description, references are made to the accompanying drawings that form a part hereof, and which are shown by way of illustration specific configurations or examples. While many examples are described using servers and disks, it should be understood that other types of compute nodes and storage devices may be used in other embodiments.

Embodiments of the disclosure include splitting the information needed for an installation into different categories, implementing a tool that takes information from multiple sources, validates the information in various ways, and combines the information into useful VNFD outputs that can incorporate all of the information.

In an embodiment, the types of information needed to build into VNFD can be divided into four types:
1. VNFC specific Information.
   For example:
   a. How many NICs does you product need? Is it a set amount, or is it up to a user?
   b. How many disks do you have?
   c. Shape of user data
   d. What security rules do you need?
2. VIM and VNFD-specific information.
   For example:
   a. What do the Heat templates look like?
   b. How to express "create a disk" in Heat vs a VNFD for AWS
   c. How does specifying anti-affinity rules look like in this VNFD?
3. Customer selections that alter the shape of a VNFD (i.e., cannot be expressed as a simple parameterization of the VNFD).
   For example:
   a. Whether to deploy a product in its paired or standalone variant, whether to deploy the VNFC with a data disk.
   b. Whether to use security groups
4. Customer environment variables.
   For example:
   a. Node names, IPs etc.
   b. How many instances to deploy The types of information needed can thus be divided and a tool (a VNFD generator, or "vnfdgen") may be implemented that:
   Takes as input:
   a solution description file (SDF) encoding the information from 3 and 4 above;
   a VNFC descriptor, encoding the information from 1 above.

Provide validation of the inputs and use the inputs, in conjunction with 2 above to produce the relevant VNFD. In one embodiment, this may be encoded into the tool.

The tool may incorporate knowledge of servers, disks, and networks, and how to create servers, disks, and networks on different VIMs. Conversely, the tool need not have VNFC-specific information.

Furthermore, the VNFC descriptor need not contain knowledge of different VIMs. The VNFC descriptor may declare, in a VIM-agnostic way, what servers, disks, networks, and user data it requires.

In an embodiment, the SDF may be a single, declarative YAML file that encapsulates the information necessary to set up a specific deployment. In an embodiment, the tool may provide validation of the SDF against a YANG schema, in conjunction with the product data defined in the VNFC descriptor.

Examples of the steps and components described above are illustrated with reference to FIG. 1. The VNFD generator 100 include a validation component 120 that receives SDF 110 which may be generated based on customer input and/or product service personnel. The validation component 120 may also receive product data 115 based on product teams input. The product data 115 may also be provided to converter component 125 that may be configured to convert the SDF 110 into the proto/VNFD class. The format for the SDF 110 and product data 115 may be human- and machine-readable format which may be automatically or manually generated based on existing documentation and/or user inputs.

In an embodiment, the product data 115 may include:
A Product Schema:
  e.g. a <vnf>.yang and yangson.json file which define a schema for any product-specific variables needed in the SDF; if, for example, a product needs a special parameter on boot-time such as "ims_home_domain", this parameter may be added to the schema, and the tool may validate that the SDF provided includes this specified parameter
A Product Data file:
  This may be a YAML file that includes information for VNFDgen pertaining to a product (e.g., how many networks it attaches to, what the flavor specs are, does it have any additional disks)
A Bootdata file:
  This may be a Jinja2 template of this product's bootdata The converter component 125 may take the schema and the SDF to build a proto VNFD object. The proto VNFD object may be defined by a proto deployment that contains a list of proto sites. In an embodiment, each proto site may contain:
  name (site.name)
  List of ProtoVnfcs objects (site.vnfcs)
  VIM type (one of 'vsphere', 'vcloud', 'openstack', aws, or 'azure') (site.vim)
  vim_config, a dictionary of keys to which Parameter objects as values, the keys are the parameter names (site.vim_config)

In an embodiment, each proto VNFC may contain:
  name (vnfc.name)
  parameters for this VNFC (vnfc.parameters) and possibly some from other VNFCs. These parameters may be generated based on the declarative configuration in the SDF (compulsory) and imperative configurations that can be passed in via extra_parameters.
  type specifying which type of VNFC this is (e.g. 'cfs') (vnfc.type)
  product_data containing Python representation of the product data file (vnfc.product_data, of type ProductData)
  ha_model, an enumeration of either PARTNERED, CLUSTERED or SINGLETON
  network_config containing the VNFC's networking configuration (vnfc.network_config)

networks object which contains a list of Networks objects (vnfc.networks)

num_vms property object, which is an integer of the number of VMs in this VNFC (vnfc.num_vms)

network_attachments object, which is an ordered list to attach this VNFC to. For each network it may be verified that a parameter "{network}_net_id" exists (vnfc.network_attachments)

disk object, which is a list of volumes to attach to this VNFC, each volume is of type Volume (vnfc.disks)

subnet_traffic_scheme property, which is a string referencing the subnet traffic scheme being used as defined in the ProductData (vnfc.subnet_traffic_scheme)

The VNFD generator 100 may provide outputs to the terraform renderer 140, Heat renderer 150, Cloudify renderer 155, and Ansible hosts renderer 160. Other renderers may be implemented in other embodiments. The terraform renderer 140 may further include terraform vCloud renderer 145 and terraform vSphere renderer 145.

The inputs to the proto VNFD 130 may be product aware and renderer independent, and the outputs from the proto VNFD 130 may be renderer aware and product independent.

Terraform renderer 140 may generate a terraform VNFD 170, the Heat renderer 150 may generate a Heat templates and Env files 17, Cloudify renderer 155 may generate Cloudify blueprints 175, and Ansible hosts renderer 160. The renderers may be configured to render the proto-VNFD into a VNFD. The conversion may be performed in a product-agnostic way.

The disclosed embodiments are advantageous in that VNFDs can be generated for all VNFCs even for new VIMs or new VNFD-types. Additionally, the VNFD generator may be extended to new VNFCs. The SDF provides a standardized configuration file that can be input from customers and service engineers that varies very little from VIM to VIM and product to product, thus abstracting the complexity of various different VNFCs. More generally, the disclosed embodiments provide a VNFD generator that combines information about classes and embodiments of products, creates a logical representation of a specific VM, and uses the logical representation to create instructions for how to create that VM in a specific environment. The VNFD generator provides a separation of 'product data' (information about a class of a virtualized network function) and customer environment choices (the specific choices for how to deploy that VNF). The VNFD generator enables the creation of a proto VNFD that provided a VNF-agnostic representation of the specific instance of that VNF, that can be used to produce VNFDs (e.g. Heat template, terraform file, ARM template), using a renderer that does not have VNF-specific knowledge.

The following provides an example integration:

```
import ietf-inet-types {
    prefix inet;
    revision-date 2021-07-15;
}
organization
    "Name";
contact
    "email";
description
    "A schema for defining the configuration of a XYZ node";
}
container example-product {
    description
        "Miscellaneous options.";
```

```
    leaf-list cds-addresses {
        type inet:ipv4-address;
        min-elements 1;
        description
            "List of signaling IPs of Config Data Store (CDS) addresses to use.";
    }
    leaf node-type-suffix {
        type string {
            pattern '[a-zA-Z0-9]*' {
                error-message "Must only contain alphanumeric characters";
            }
        }
        default " ";
        description
            "Suffix to add to the node type when deriving the group id. Should normally be left
            blank.";
    }
}
```

The following is an example user data YAML file:

```
#cloud-config
write files:
  - path: /var/lib/cloud/instance/user-data.txt
    content: |
    {
        "hostname": "{{indexth_of.node_names}}",
        "dns_servers": {{parameters.management_dns_servers}},
        "ntp_servers": {{parameters.ntp_servers}},
        "timezone": "{{parameters.timezone}}",
        "cds_addresses": {{parameters.cds_addresses}},
        {%- if "deployment_id" in parameters %}
        "deployment_id": "{{parameters.deployment_id}}",
        {%- endif %}
        "management": {
            "ip_address": "{{indexth_of.management_ip_list}}",
            "subnet": "{{parameters.management_subnet}}",
            "gateway": "{{parameters.management_gateway}}",
            {%- if "availability_zone" in parameters %}
            "mac_address": "{{dynamic.management_mac_address}}"
            {%- endif %}
        },
        "signaling": {
            "ip_address": "{{indexth_of.signaling_ip_list}}",
            "subnet": "{{parameters.signaling_subnet}}",
            "gateway": "{{parameters.signaling_gateway}}",
            {%- if "availability_zone" in parameters %}
            "mac_address": "{{dynamic.signaling_mac_address}}"
            {%- endif %}
        },
        {%- if "ssh_authorized_keys" in parameters %}
        "ssh_authorized_keys":
        {{parameters.ssh_authorized_keys}},
        {%- endif %}
        {%- if "node_type_suffix" in parameters %}
        "node_type_suffix": "{{parameters.node_type_suffix}}",
        {%- endif %}
        {%- if "site_id" in parameters %}
        "site_id": "{{parameters.site_id}}"
        {%- endif %}
        "service_group": "{{parameters.service_group}}"
    }
```

The following is an example product data YAML file:

```
msw-product-data : product-data:
    product-data-schema-version: 1.0.0
    ha-model: clustered
```

-continued

```
networking:
  nic-order:
    - management
    - signaling
  subnet-traffic-schemes:
    scheme1:
      - management
      - signaling
  bootstrap-data-injection-method:
    vsphere: vapp-properties
    vcloud: msw-deployment-info
    openstack: config-drive
  additional-volumes:
    - size-determiner: fixed
      size: 30
      independent: True
      name: diagnostics-disk
  vapp-properties: # Test some different kinds of parameter substitutions
    hostname: "{{indexth_of. node_names}}" # From VNFC
    dns_servers: "{{parameters.management_dns_servers}}"
    timezone: "{{parameters.timezone}}" # From site-level config
    cds_addresses: "{{parameters.cds_addresses}}"
    management.ip_address: "{{indexth_of.management_ip_list}}"
    ssh_authorized_keys: '{%- if "ssh_authorized_keys" in parameters %}{{parameters.ssh_authorized_keys}}{%- endif %}'
    management_subnet_netmask: "{{ parameters.management_subnet.convert_to_netmask() }}"
  flavors:
    - name: lab
      cpu: 1
      memory: 8192
      boot-disk-size: 30
    - name: low
      cpu: 4
      memory: 8192
      boot-disk-size: 30
  default-super-user:
    username: name
    password: "pw"
  default-image-name: "default-image-shcm"
```

The SDF may have a high level of a list of sites, each keyed off the name:
module: msw-deployment
+ - - deployment!
  + - - sites* [name]
    + - - name
    + - - site-parameters
    + - - vnfcs* [name]
Each site may contain three sections:
a name
a site-parameters section
a list of VNFCs
The site-parameters section defines configuration common across the site and may have the following structure:
+ - - site-parameters
| + - - deployment-id
| + - - site-id?
| + - - vnfm-configuration
| + - - vim-configuration
| | + - - type
| | + - - azure
| | + - - openstack
| | + - - vsphere
| | + - - vcloud
| + - - fixed-ips?
| + - - networking
| | + - - subnets* [identifier]
| | + - - allow-subnet?
| + - - mdm!
| + - - services

| | + - - radius!
| | + - - ntp-servers*
| + - - timezone?
Each VNFC may include:
+ - - vnfcs* [name]
  + - - name
  + - - type
  + - - image
  + - - networks
  + - - cross-site-discovery
  + - - paired-configuration/cluster-configuration
  + - - azure/openstack/vsphere
  + - - product-options
    + - - dev-options
    + - - (product-choice)

In an embodiment, SDF validation may include:
Validating the SDF against the YANG schemas (both the main SDF YANG schema and the product-options and solution-options YANG schemas).
Validating the SDF using product specific information in the Product Data files.
The product data folders may contain the following four files:
A vnfc.yang YANG Schema for defining and validating the shape of the products options
A yangson.json, which is a pointer to vnfdgen to tell vnfdgen where to find the YANG schema
A product-data file which describes to vnfdgen the properties of the VNFC needed in order to instantiate it.
A user-data file that defines the shape of user data that this VNFC takes.
The following is an example SDF:

```
deployment:deployment:
  sites:
    - name: site-one
      site-parameters:
        timezone: USA/Pacific
        deployment-id: sample
        networking:
          subnets:
            - cidr: 192.168.11.0/24
              identifier: mgmt-subnet
              vim-network: dvManagement
              default-gateway: 192.168.11.1
              dns-servers:
                - 172.18.10.55
            - cidr: 192.168.12.0/24
              identifier: signaling-subnet
              vim-network: dvSignalling
              default-gateway: 192.168.12.1
            - cidr: 192.168.14.0/24
              identifier: ha-subnet
              vim-network: dvHA
              default-gateway: 192.168.14.1
        services :
          ntp-servers :
            - 10.254.123.1
            - 10.254.123.2
            - 10.254.123.3
        site-id: DC1
        vim-configuration:
          azure:
            location: "south"
            address-space: 192.168.0.0/16
            subscription: "subscription-id"
            tenant: "tenant-id"
            use-msi: true
        mdm:
          ssl-certificate-management: static
          static-certificate: |-
```

```
        -----BEGIN CERTIFICATE-----
        Imastaticcertificate
        -----END CERTIFICATE-----
    ca-certificate: |-
        -----BEGIN CERTIFICATE-----
        ImaCAcertificate
        -----END CERTIFICATE-----
    private-key: |-
        -----BEGIN RSA PRIVATE KEY-----
        Thisisaprivatekey
        -----END RSA PRIVATE KEY-----
vnfcs :
- name: singleton-vnfc
  type: singleton
  vim-configuration:
    azure:
      vm-size: "Standard_DS3_v2"
      image-location: "/full/path/to/image"
      availability-zone: "1"
  networks:
    - subnet: mgmt-subnet
      traffic-types:
        - management
      name: Management
      ip-addresses:
        ip: 192.168.11.48
  product-options:
    singleton:
      sort-locale: es_ES
      help-text-version: telc
      cluster-name: foo-cluster
      snmp:
        type: TRAP
        ip: 10.225.26.100
        port: 162
        source-port: 8007
      remote-backup:
        backup-ip: 10.225.26.100
        backup-username: backup
        backup-password: "backup"
      web-services: true
- name: example-mdm
  type: mdm
  cluster-configuration:
    count: 2
    instances:
      - name: mdm1
      - name: mdm2
  vim-configuration:
    azure:
      vm-size: "Standard_DS3_v2"
      image-location: "/full/path/to/image"
      availability-zone: "2"
  networks:
    - subnet: mgmt-subnet
      traffic-types:
        - management
      name: Management
      public-ip: true
      ip-addresses:
        ip:
          - 192.168.11.49
          - 192.168.11.50
    - subnet: signaling-subnet
      traffic-types :
        - signaling
      name: Signaling
      ip-addresses:
        ip:
          - 192.168.12.49
          - 192.168.12.50
  product-options :
    mdm:
      snmp:
        community-string: public
        trap-destinations:
          - 5.6.7.8
      consul-token: ARTOTXLPW19vSTIx-C-MS-MDM
- name: site-two
  site-parameters:
    timezone: Europe/London
    networking:
      subnets:
        - cidr: 10.10.10.0/24
          identifier: MGMT
          vim-network: dvManagement
          default-gateway: 10.10.10.1
          dns-servers :
            - 172.18.10.55
    services:
      ntp-servers:
        - 10.254.123.1
        - 10.254.123.2
        - 10.254.123.3
  vim-configuration:
    vsphere :
      connection:
        server: vspherecenter.internal.com
        user: automation-user
        password: automation-passw0rd
        datacenter: Automationsite
  vnfcs:
    - name: example-vnfc-2
      type: example-product
      vim-configuration:
        vsphere:
          deployment_size: low
          folder: myfoldertoputthesevms
      cluster-configuration:
        count: 2
        instances:
          - name: example-instance-1
          - name: example-instance-2
      networks:
        - subnet: MGMT
          traffic-types:
            - management
          name: Management
          public-ip: true
          ip-addresses:
            ip:
              - 10.10.10.4
              - 10.10.10.5
      product-options:
        singleton:
          cds-addresses:
            10.10.10.10
```

Figure 2:
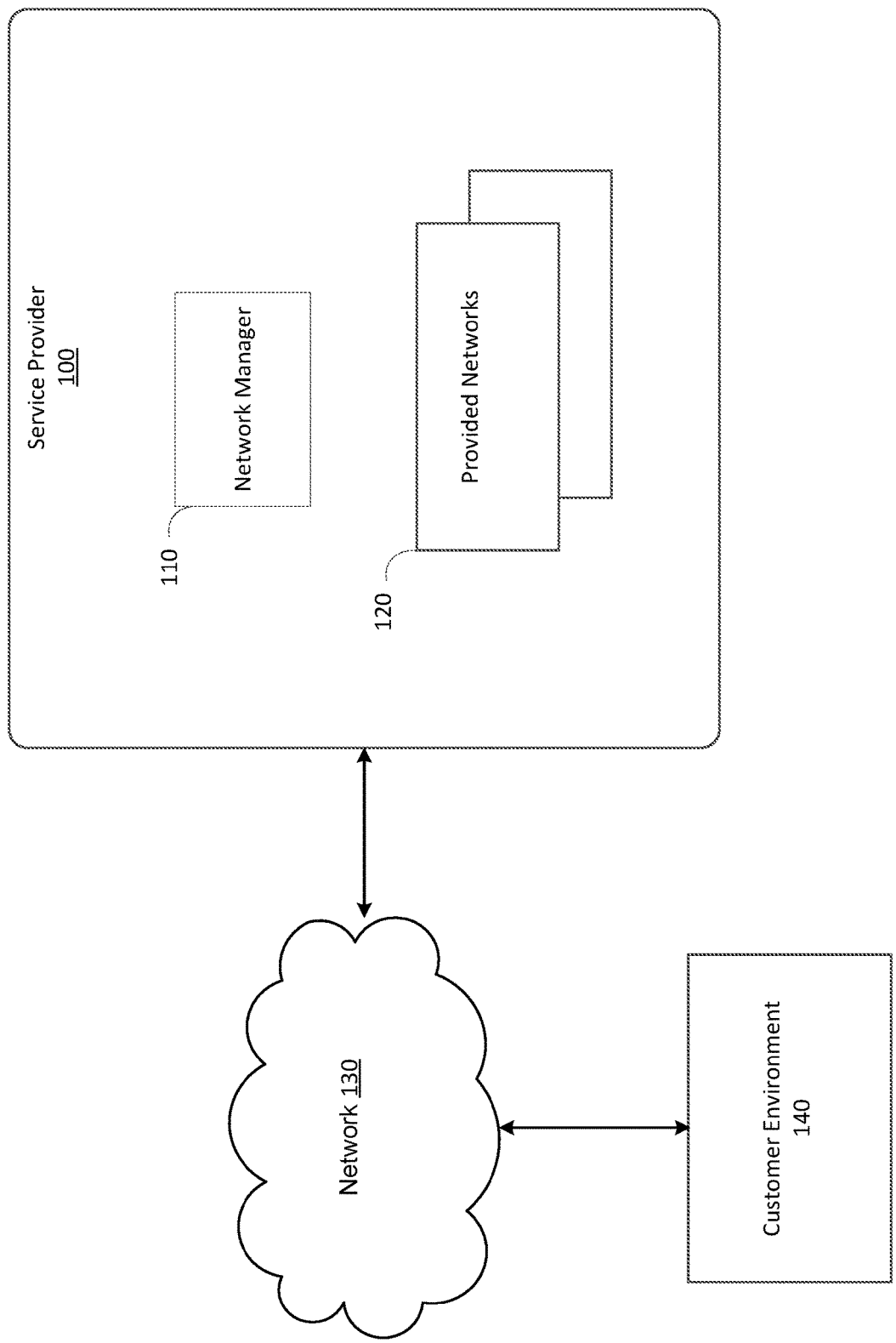
FIG. 2 is a diagram illustrating an example architecture in accordance with the present disclosure.

FIG. 2 illustrates an example computing environment in which the embodiments described herein may be implemented. FIG. 2 illustrates a service provider 100 that is configured to provide computing resources to users at customer environment 140. The customer environment 140 may have user computers that may access services provided by service provider 100 via a network 130. The computing resources provided by the service provider 100 may include various types of resources, such as computing resources, data storage resources, data communication resources, and the like. Each type of computing resource may be general-purpose or may be available in a number of specific configurations. For example, computing resources may be available as virtual machines. The virtual machines may be configured to execute applications, including Web servers, application servers, media servers, database servers, and the like. Data storage resources may include file storage devices, block storage devices, and the like.

Each type or configuration of computing resource may be available in different configurations, such as the number of processors, and size of memory and/or storage capacity. The resources may in some embodiments be offered to clients in units referred to as instances, such as virtual machine instances or storage instances. A virtual computing instance may be referred to as a virtual machine and may, for example, comprise one or more servers with a specified computational capacity (which may be specified by indicating the type and number of CPUs, the main memory size and so on) and a specified software stack (e.g., a particular version of an operating system, which may in turn run on top of a hypervisor). Networking resources may include virtual networking, software load balancer, and the like. The virtual machines may be configured to execute applications, including Web servers, application servers, media servers, database servers, and the like. Data storage resources may include file storage devices, block storage devices, and the like.

Service provider 100 may have various computing resources including servers, routers, and other devices that may provide remotely accessible computing and network resources using, for example, virtual machines. Other resources that may be provided include data storage resources. Service provider 100 may also execute functions that manage and control allocation of network resources, such as a network manager 110.

Network 130 may, for example, be a publicly accessible network of linked networks and may be operated by various entities, such as the Internet. In other embodiments, network 130 may be a private network, such as a dedicated network that is wholly or partially inaccessible to the public. Network 130 may provide access to computers and other devices at the customer environment 140.

The disclosed embodiments may be implemented in a mobile edge computing (MEC) environment implemented in conjunction with a 4G, 5G, or other cellular network. The MEC environment may include at least some of the components and functionality described in FIG. 1 above. Additionally, components of a 5G network may include network functions such as a Session Management Function (SMF), Policy Control Function (PCF), and N7 interface. A radio access network (RAN) may comprise 5G-capable UEs, a base station gNodeB that communicates with an Access and Mobility Management Function (AMF) in a 5G Core (5GC) network. The 5G network may further comprise a User Plane Function (UPF) and Policy Charging Function (PCF).

It should be appreciated that although the embodiments disclosed above are discussed in the context of virtual machines, other types of implementations can be utilized with the concepts and technologies disclosed herein. It should be also appreciated that the network topology illustrated in FIG. 2 has been greatly simplified and that many more networks and networking devices may be utilized to interconnect the various computing systems disclosed herein. These network topologies and devices should be apparent to those skilled in the art.

Figure 3:
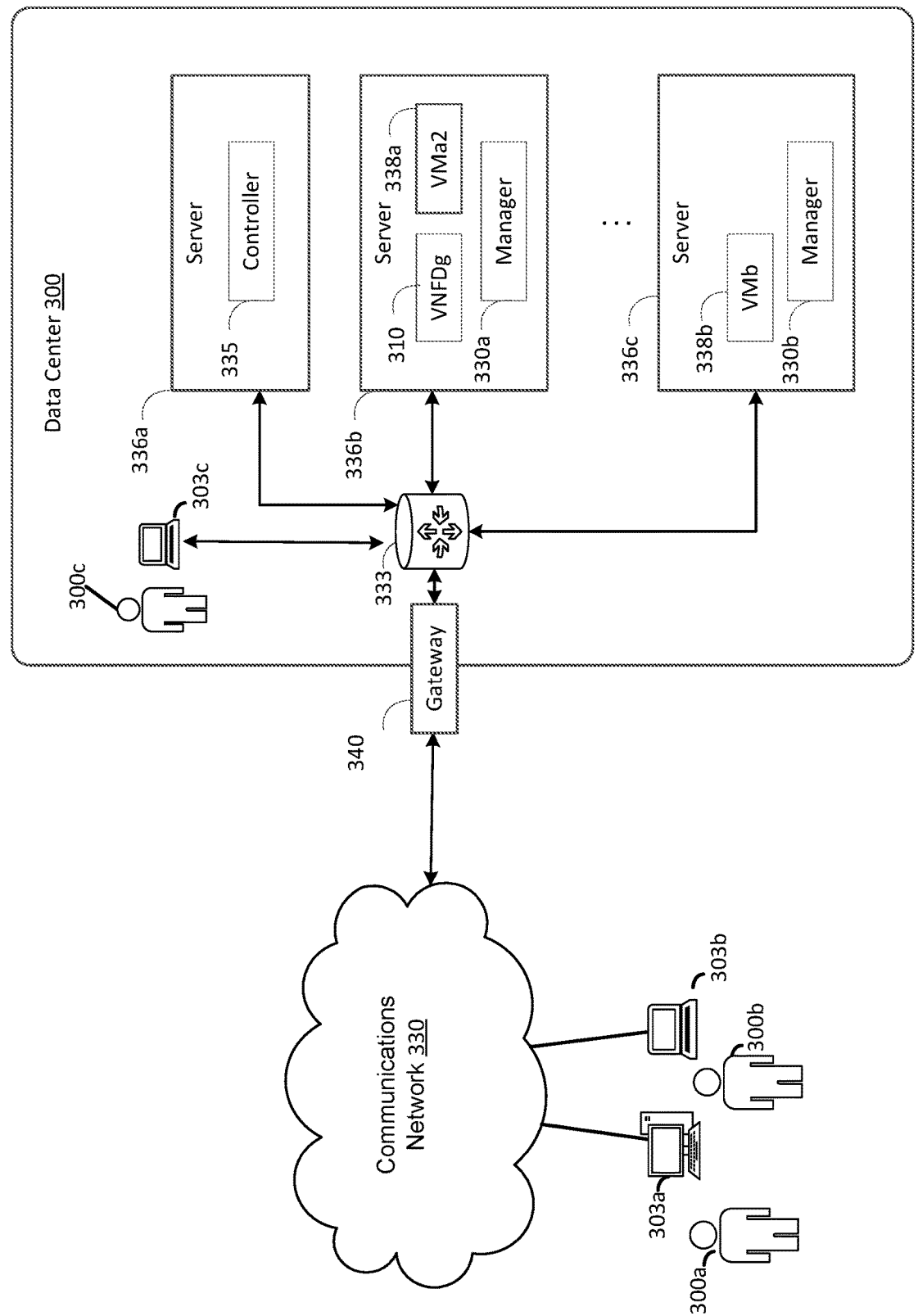
FIG. 3 is a diagram illustrating an example architecture in accordance with the present disclosure.

FIG. 3 illustrates an example computing environment in which the embodiments described herein may be implemented. FIG. 3 illustrates a data center 300 that is configured to provide computing resources to users 300a, 300b, or 300c (which may be referred herein singularly as "a user 300" or in the plural as "the users 300") via user computers 303a, 303b, and 303c (which may be referred herein singularly as "a computer 303" or in the plural as "the computers 303") via a communications network 330. The computing resources provided by the data center 300 may include various types of resources, such as computing resources, data storage resources, data communication resources, and the like. Each type of computing resource may be general-purpose or may be available in a number of specific configurations. For example, computing resources may be available as virtual machines. The virtual machines may be configured to execute applications, including Web servers, application servers, media servers, database servers, and the like. Data storage resources may include file storage devices, block storage devices, and the like. Each type or configuration of computing resource may be available in different configurations, such as the number of processors, and size of memory and/or storage capacity. The resources may in some embodiments be offered to clients in units referred to as instances, such as virtual machine instances or storage instances. A virtual computing instance may be referred to as a virtual machine and may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

Data center 300 may correspond to data center 100 and 110 of FIG. 2. Data center 300 may include servers 336a, 336b, and 336c (which may be referred to herein singularly as "a server 336" or in the plural as "the servers 336") that may be standalone or installed in server racks, and provide computing resources available as virtual machines 338a and 338b (which may be referred to herein singularly as "a virtual machine 338" or in the plural as "the virtual machines 338"). The virtual machines 338 may be configured to execute applications such as Web servers, application servers, media servers, database servers, and the like. Other resources that may be provided include data storage resources (not shown on FIG. 3) and may include file storage devices, block storage devices, and the like. Servers 336 may also execute functions that manage and control allocation of resources in the data center, such as a controller 335. Controller 335 may be a fabric controller or another type of program configured to manage the allocation of virtual machines on servers 336.

In an embodiment, a VNFD generator (VNFDg) 310 as described herein may be implemented in server 336b.

Referring to FIG. 3, communications network 330 may, for example, be a publicly accessible network of linked networks and may be operated by various entities, such as the Internet. In other embodiments, communications network 330 may be a private network, such as a corporate network that is wholly or partially inaccessible to the public.

Communications network 330 may provide access to computers 303. Computers 303 may be computers utilized by users 300. Computer 303a, 303b or 303c may be a server, a desktop or laptop personal computer, a tablet computer, a smartphone, a set-top box, or any other computing device capable of accessing data center 300. User computer 303a or 303b may connect directly to the Internet (e.g., via a cable modem). User computer 303c may be internal to the data center 300 and may connect directly to the resources in the data center 300 via internal networks. Although only three user computers 303a,303b, and 303c are depicted, it should be appreciated that there may be multiple user computers.

Computers 303 may also be utilized to configure aspects of the computing resources provided by data center 300. For example, data center 300 may provide a Web interface through which aspects of its operation may be configured through the use of a Web browser application program executing on user computer 303. Alternatively, a stand-alone application program executing on user computer 303 may be used to access an application programming interface (API) exposed by data center 300 for performing the configuration operations.

Servers 336 may be configured to provide the computing resources described above. One or more of the servers 336 may be configured to execute a manager 330a or 330b (which may be referred herein singularly as "a manager 330" or in the plural as "the managers 330") configured to execute the virtual machines. The managers 330 may be a virtual machine monitor (VMM), fabric controller, or another type of program configured to enable the execution of virtual machines 338 on servers 336, for example.

It should be appreciated that although the embodiments disclosed above are discussed in the context of virtual machines, other types of implementations can be utilized with the concepts and technologies disclosed herein.

In the example data center 300 shown in FIG. 3, a network device 333 may be utilized to interconnect the servers 336a and 336b. Network device 333 may comprise one or more switches, routers, or other network devices. Network device 333 may also be connected to gateway 340, which is connected to communications network 330. Network device 333 may facilitate communications within networks in data center 300, for example, by forwarding packets or other data communications as appropriate based on characteristics of such communications (e.g., header information including source and/or destination addresses, protocol identifiers, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

It should be appreciated that the network topology illustrated in FIG. 3 has been greatly simplified and that many more networks and networking devices may be utilized to interconnect the various computing systems disclosed herein. These network topologies and devices should be apparent to those skilled in the art.

It should also be appreciated that data center 300 described in FIG. 3 is merely illustrative and that other implementations might be utilized. Additionally, it should be appreciated that the functionality disclosed herein might be implemented in software, hardware or a combination of software and hardware. Other implementations should be apparent to those skilled in the art. It should also be appreciated that a server, gateway, or other computing device may comprise any combination of hardware or software that can interact and perform the described types of functionality, including without limitation desktop or other computers, database servers, network storage devices and other network devices, PDAs, tablets, smartphone, Internet appliances, television-based systems (e.g., using set top boxes and/or personal/digital video recorders), and various other consumer products that include appropriate communication capabilities. In addition, the functionality provided by the illustrated modules may in some embodiments be combined in fewer modules or distributed in additional modules. Similarly, in some embodiments the functionality of some of the illustrated modules may not be provided and/or other additional functionality may be available.

Figure 4:
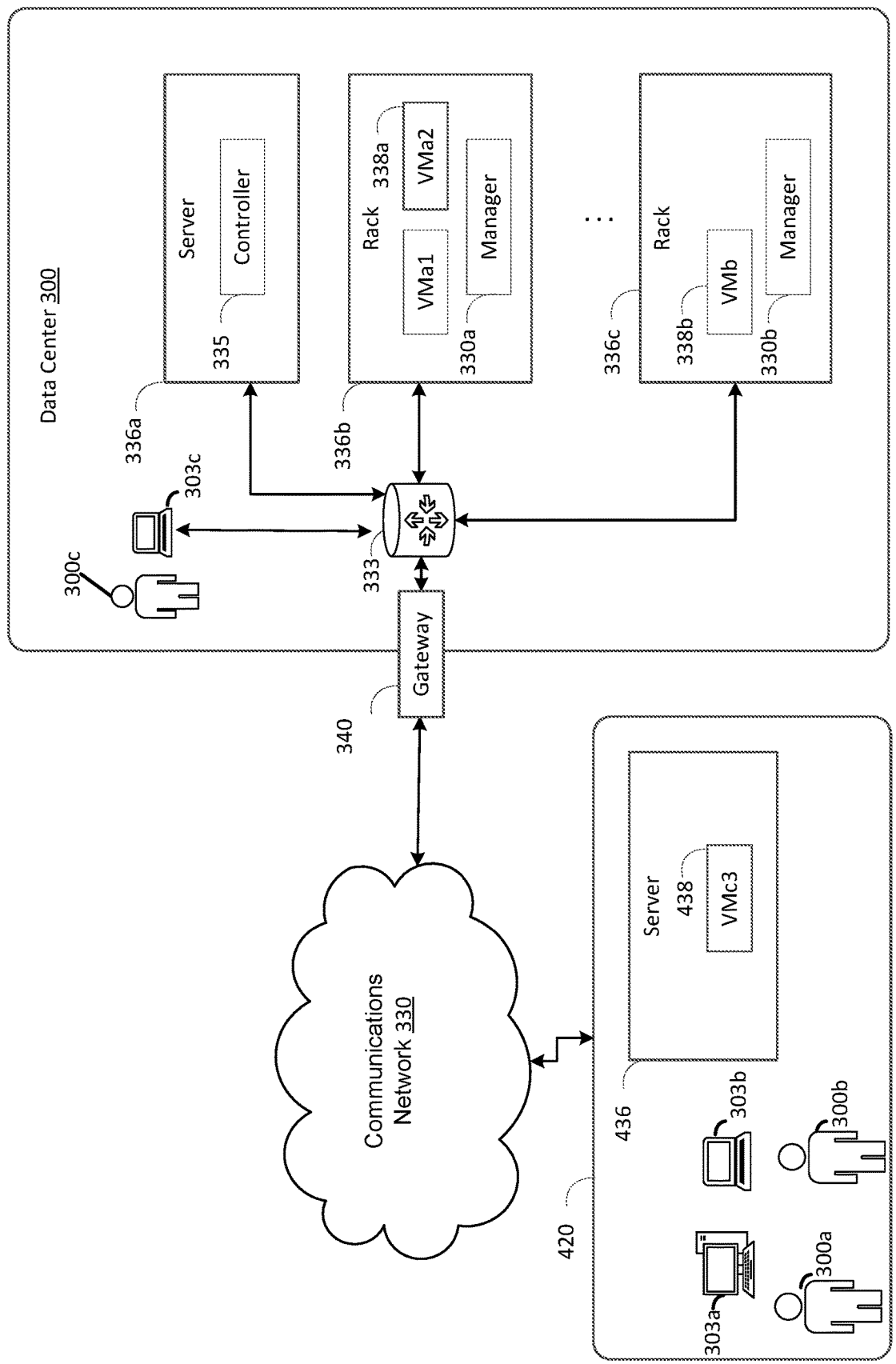
FIG. 4 is a diagram illustrating an example architecture in accordance with the present disclosure.

FIG. 4 illustrates an example computing environment illustrating management of resources at deployment site 420, in accordance with the present disclosure. In one embodiment, one or more servers 436 may be installed at the edge site 420. In an embodiment, servers 436 instantiate and run virtual machines 438.

In some embodiments, users 300 may specify configuration information for a virtual network to be provided for the user, with the configuration information optionally including a variety of types of information such as network addresses to be assigned to computing endpoints of the provided computer network, network topology information for the provided computer network, network access constraints for the provided computer network. The network addresses may include, for example, one or more ranges of network addresses, which may correspond to a subset of virtual or private network addresses used for the user's private computer network. The network topology information may indicate, for example, subsets of the computing endpoints to be grouped together, such as by specifying networking devices to be part of the provided computer network, or by otherwise indicating subnets of the provided computer network or other groupings of the provided computer network. The network access constraint information may indicate, for example, for each of the provided computer network's computing endpoints, which other computing endpoints may intercommunicate with the computing node endpoint, or the types of communications allowed to/from the computing endpoints.

Figure 5:
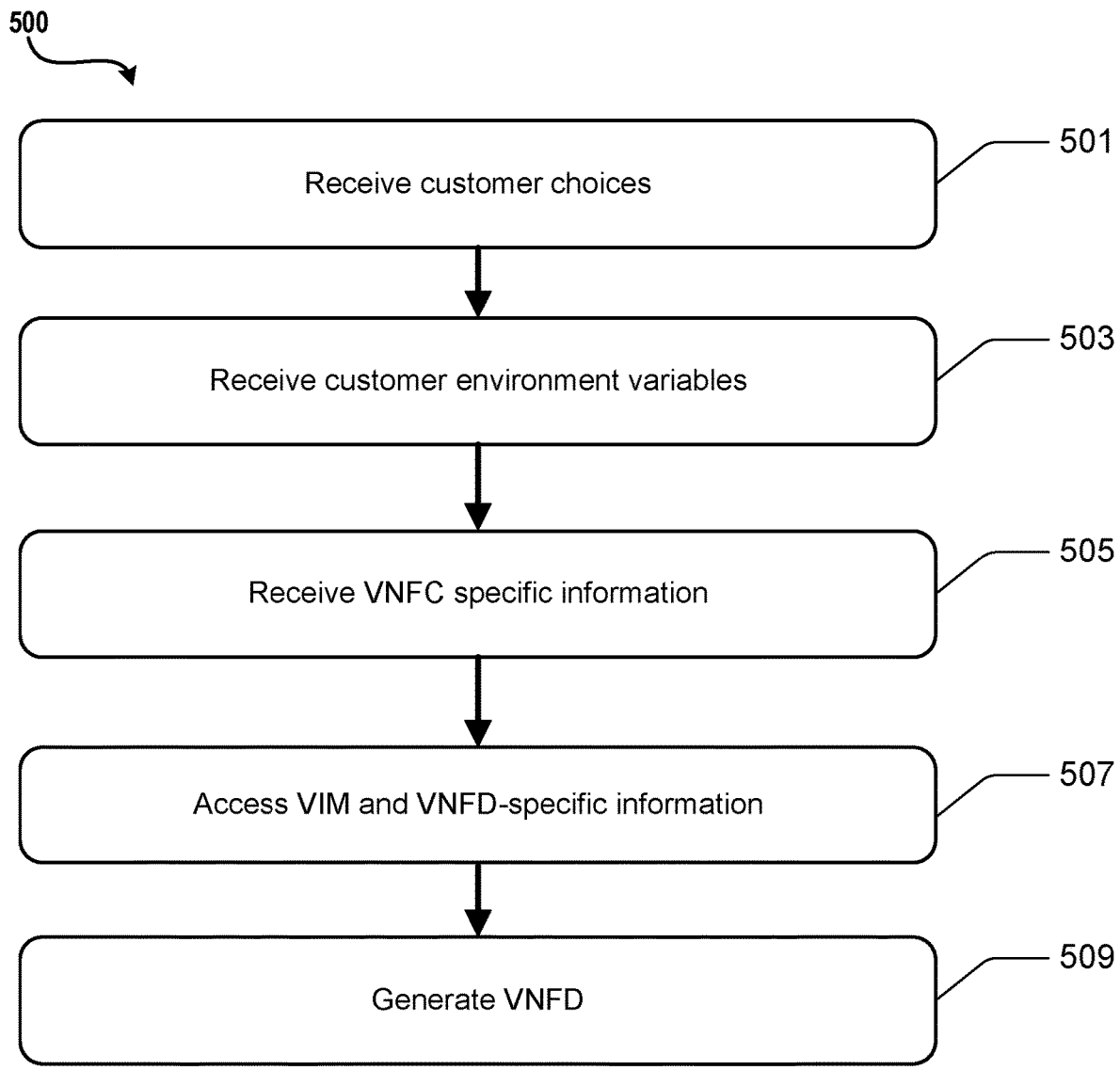
FIG. 5 is a flowchart depicting an example procedure for generating a virtualized network function (VNF) descriptor (VNFD) in accordance with the present disclosure.

Turning now to FIG. 5, illustrated is an example operational procedure for efficiently coordinating the upgrade of a VNFC running across various VMs in accordance with the present disclosure. In an embodiment, the computing environment comprises a computing service provider and a remote computing network.

Referring to FIG. 5, operation 501 illustrates receiving customer choices. Operation 501 may be followed by operation 503. Operation 503 illustrates receiving customer environment variables. Operation 503 may be followed by operation 505. Operation 505 illustrates receiving VNFC-specific information. Operation 505 may be followed by operation 507. Operation 507 illustrates accessing VIM and VNFD-specific information. Operation 507 may be followed by operation 509. Operation 509 illustrates generating a VNFD.

Figure 6:
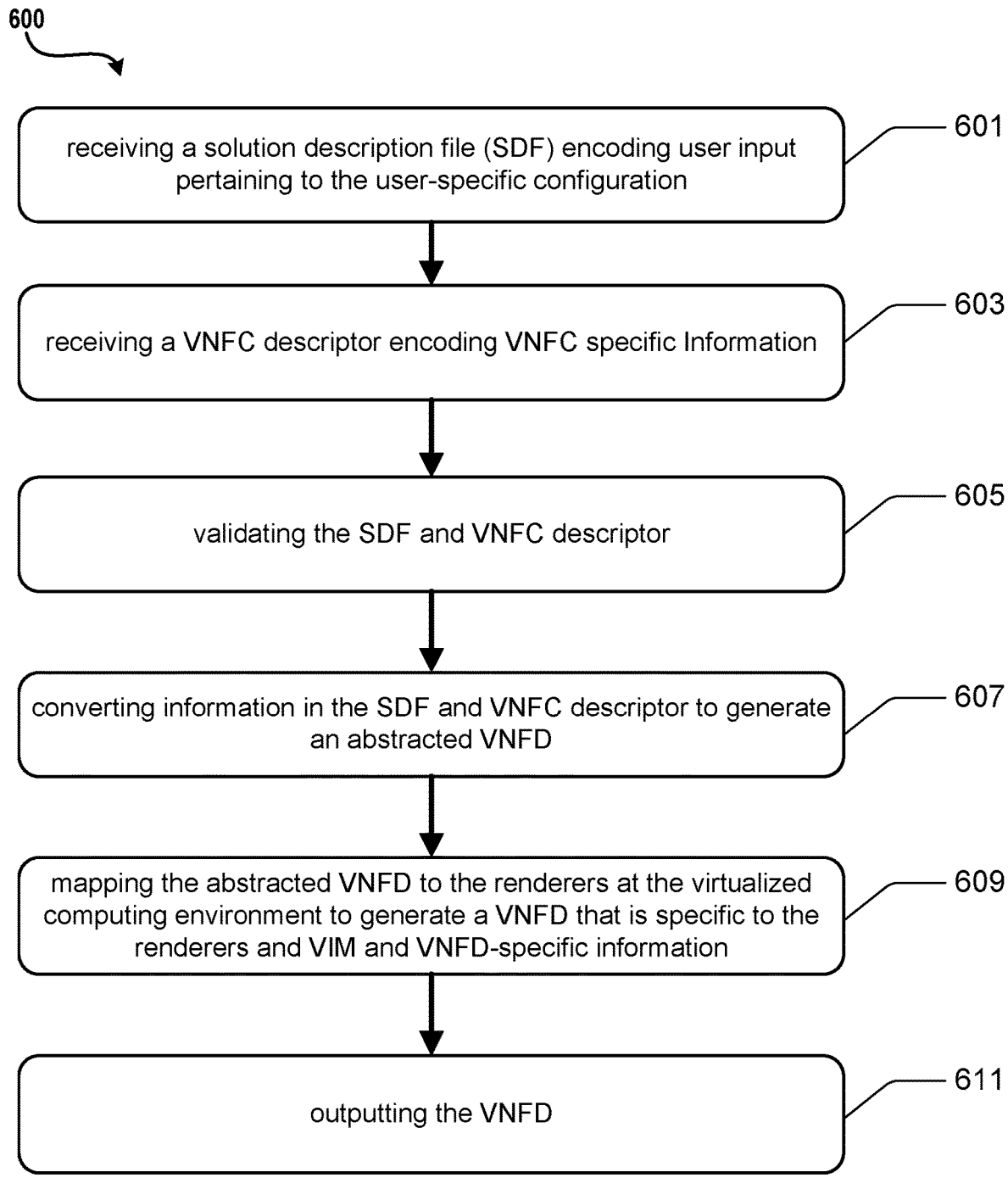
FIG. 6 is a flowchart depicting an example procedure for generating a virtualized network function (VNF) descriptor (VNFD) in accordance with the present disclosure.

Turning now to FIG. 6, illustrated is an example operational procedure for generating a virtualized network function (VNF) descriptor (VNFD) indicative of resources for managing VNF components (VNFCs) across a plurality of virtualized infrastructure managers (VIMs) implemented in a virtualized computing environment configured in a user-specific configuration. In an embodiment, the VNF may be implemented by a plurality of VNFCs executing in a plurality of virtual machines managed by the VIMs. Such an operational procedure can be provided by one or more components illustrated in FIGS. 1 through 5. The operational procedure may be implemented in a system comprising one or more computing devices. It should be understood by those of ordinary skill in the art that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, performed together, and/or performed simultaneously, without departing from the scope of the appended claims.

It should also be understood that the illustrated methods can end at any time and need not be performed in their entireties. Some or all operations of the methods, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

It should be appreciated that the logical operations described herein are implemented (1) as a sequence of computer implemented acts or program modules running on a computing system such as those described herein) and/or (2) as interconnected machine logic circuits or circuit modules within the computing system. The implementation is a matter of choice dependent on the performance and other requirements of the computing system. Accordingly, the logical operations may be implemented in software, in firmware, in special purpose digital logic, and any combination thereof. Thus, although the routine 300 is described as running on a system, it can be appreciated that the routine 300 and other operations described herein can be executed on an individual computing device or several devices.

Referring to FIG. 6, operation 601 illustrates receiving, by a VNFD generator executing on a computing device, a solution description file (SDF) encoding user input pertaining to the user-specific configuration.

Operation 601 may be followed by operation 603. Operation 603 illustrates receiving, by THE VNFD generator executing on a computing device, a VNFC descriptor encoding VNFC specific Information.

Operation 603 may be followed by operation 605. Operation 605 illustrates validating, by the VNFD generator, the SDF and VNFC descriptor.

Operation 605 may be followed by operation 607. Operation 607 illustrates converting information in the SDF and VNFC descriptor to generate an abstracted VNFD that is independent of renderers implemented at the virtualized computing environment configured in the user-specific configuration. In an embodiment, the abstracted VNFD may be usable for mapping to renderers at the virtualized computing environment while abstracting details of the VNFC specific information.

Operation 607 may be followed by operation 609. Operation 609 illustrates mapping the abstracted VNFD to the renderers at the virtualized computing environment to generate a VNFD that is specific to the renderers and VIM and VNFD-specific information at the virtualized computing environment configured in the user-specific configuration.

Operation 609 may be followed by operation 611. Operation 611 illustrates outputting the VNFD to the virtualized computing environment.

The various aspects of the disclosure are described herein with regard to certain examples and embodiments, which are intended to illustrate but not to limit the disclosure. It should be appreciated that the subject matter presented herein may be implemented as a computer process, a computer-controlled apparatus, a computing system, an article of manufacture, such as a computer-readable storage medium, or a component including hardware logic for implementing functions, such as a field-programmable gate array (FPGA) device, a massively parallel processor array (MPPA) device, a graphics processing unit (GPU), an application-specific integrated circuit (ASIC), a multiprocessor System-on-Chip (MPSoC), etc.

A component may also encompass other ways of leveraging a device to perform a function, such as, for example, a) a case in which at least some tasks are implemented in hard ASIC logic or the like; b) a case in which at least some tasks are implemented in soft (configurable) FPGA logic or the like; c) a case in which at least some tasks run as software on FPGA software processor overlays or the like; d) a case in which at least some tasks run as software on hard ASIC processors or the like, etc., or any combination thereof. A component may represent a homogeneous collection of hardware acceleration devices, such as, for example, FPGA devices. On the other hand, a component may represent a heterogeneous collection of different types of hardware acceleration devices including different types of FPGA devices having different respective processing capabilities and architectures, a mixture of FPGA devices and other types hardware acceleration devices, etc.

Figure 7:
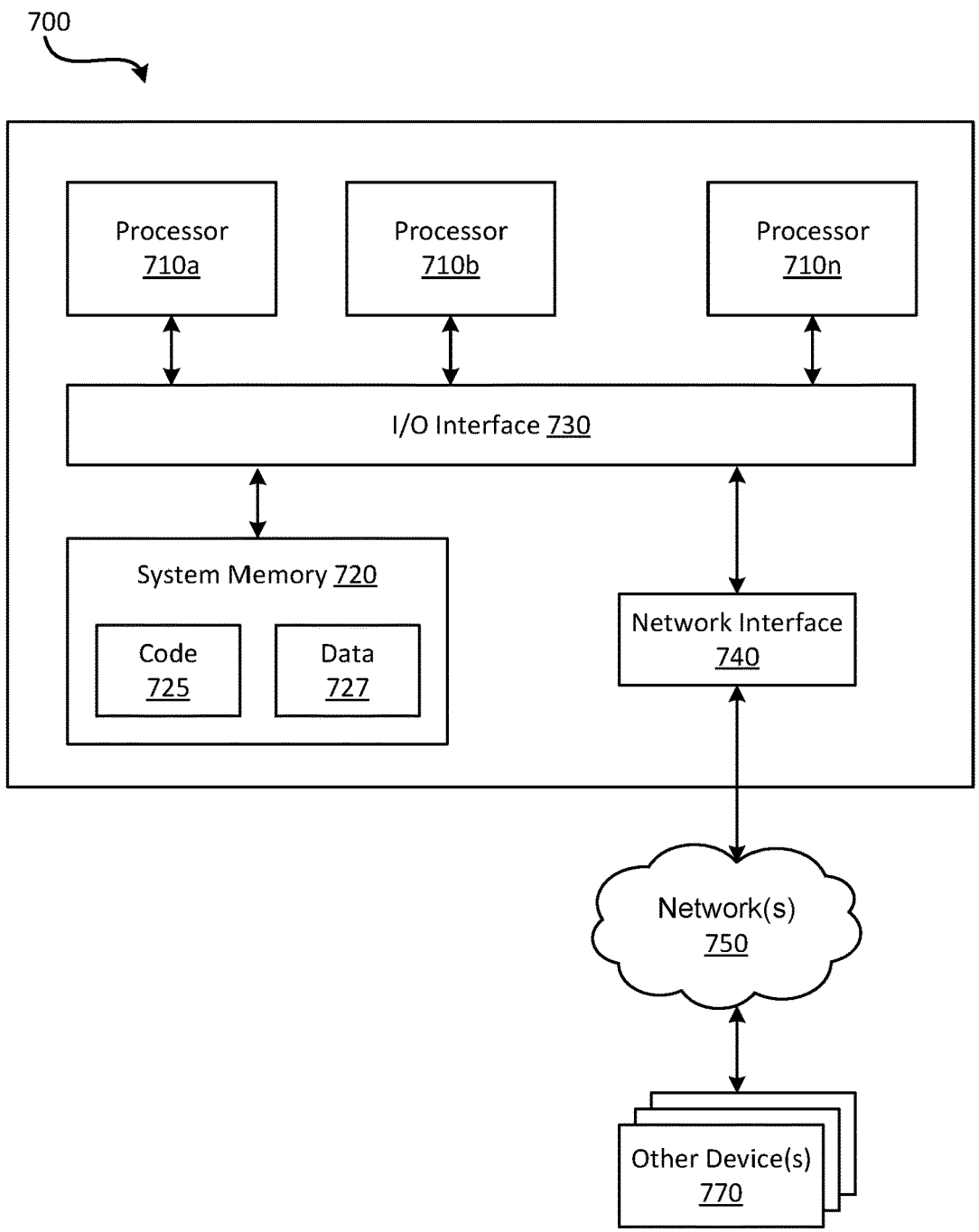
FIG. 7 is an example computing system in accordance with the present disclosure.

FIG. 7 illustrates a general-purpose computing device 700. In the illustrated embodiment, computing device 700 includes one or more processors 710a, 710b, and/or 710n (which may be referred herein singularly as "a processor 710" or in the plural as "the processors 710") coupled to a system memory 720 via an input/output (I/O) interface 730. Computing device 700 further includes a network interface 740 coupled to I/O interface 730.

In various embodiments, computing device 700 may be a uniprocessor system including one processor 710 or a multiprocessor system including several processors 710 (e.g., two, four, eight, or another suitable number). Processors 710 may be any suitable processors capable of executing instructions. For example, in various embodiments, processors 710 may be general-purpose or embedded processors implementing any of a variety of instruction set architectures (ISAs), such as the x77, PowerPC, SPARC, or MIPS ISAs, or any other suitable ISA. In multiprocessor systems, each of processors 710 may commonly, but not necessarily, implement the same ISA.

System memory 720 may be configured to store instructions and data accessible by processor(s) 710. In various embodiments, system memory 720 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques and data described above, are shown stored within system memory 720 as code 725 and data 727.

In one embodiment, I/O interface 730 may be configured to coordinate I/O traffic between the processor 710, system memory 720, and any peripheral devices in the device, including network interface 740 or other peripheral interfaces. In some embodiments, I/O interface 730 may perform any necessary protocol, timing, or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components. Also, in some embodiments some or all of the functionality of I/O interface 730, such as an interface to system memory 720, may be incorporated directly into processor 710.

Network interface 740 may be configured to allow data to be exchanged between computing device 700 and other device or devices 770 attached to a network or network(s) 750, such as other computer systems or devices as illustrated in FIGS. 1 through 5, for example. In various embodiments, network interface 740 may support communication via any suitable wired or wireless general data networks, such as types of Ethernet networks, for example. Additionally, network interface 740 may support communication via telecommunications/telephony networks such as analog voice networks or digital fiber communications networks, via storage area networks such as Fibre Channel SANs or via any other suitable type of network and/or protocol.

In some embodiments, system memory 820 may be one embodiment of a computer-accessible medium configured to store program instructions and data as described above for FIGS. 1-8 for implementing embodiments of the corresponding methods and apparatus. However, in other embodiments, program instructions and/or data may be received, sent or stored upon different types of computer-accessible media. A computer-accessible medium may include non-transitory storage media or memory media, such as magnetic or optical media, e.g., disk or DVD/CD coupled to computing device 700 via I/O interface 730. A non-transitory computer-accessible storage medium may also include any volatile or non-volatile media, such as RAM (e.g. SDRAM, DDR SDRAM, RDRAM, SRAM, etc.), ROM, etc., that may be included in some embodiments of computing device 700 as system memory 720 or another type of memory. Further, a computer-accessible medium may include transmission media or signals such as electrical, electromagnetic or digital signals, conveyed via a communication medium such as a network and/or a wireless link, such as may be implemented via network interface 740. Portions or all of multiple computing devices, such as those illustrated in FIG. 7, may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices and is not limited to these types of devices.

Various storage devices and their associated computer-readable media provide non-volatile storage for the computing devices described herein. Computer-readable media as discussed herein may refer to a mass storage device, such as a solid-state drive, a hard disk or CD-ROM drive. However, it should be appreciated by those skilled in the art that computer-readable media can be any available computer storage media that can be accessed by a computing device.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computing devices discussed herein. For purposes of the claims, the phrase "computer storage medium," "computer-readable storage medium" and variations thereof, does not include waves, signals, and/or other transitory and/or intangible communication media, per se.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the disclosed computing devices in order to store and execute the software components and/or functionality presented herein. It is also contemplated that the disclosed computing devices may not include all of the illustrated components shown in FIG. 7, may include other components that are not explicitly shown in FIG. 7, or may utilize an architecture completely different than that shown in FIG. 7.

Although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

It should be appreciated any reference to "first," "second," etc. items and/or abstract concepts within the description is not intended to and should not be construed to necessarily correspond to any reference of "first," "second," etc. elements of the claims. In particular, within this Summary and/or the following Detailed Description, items and/or abstract concepts such as, for example, individual computing devices and/or operational states of the computing cluster may be distinguished by numerical designations without such designations corresponding to the claims or even other paragraphs of the Summary and/or Detailed Description. For example, any designation of a "first operational state" and "second operational state" of the computing cluster within a paragraph of this disclosure is used solely to distinguish two different operational states of the computing cluster within that specific paragraph—not any other paragraph and particularly not the claims.

In closing, although the various techniques have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter. The disclosure presented herein also encompasses the subject matter set forth in the following clauses:

Clause 1: A method for generating a virtualized network function (VNF) descriptor (VNFD) indicative of resources for managing VNF components (VNFCs) across a plurality of virtualized infrastructure managers (VIMs) implemented in a virtualized computing environment configured in a user-specific configuration, the VNF implemented by a plurality of VNFCs executing in a plurality of virtual machines managed by the VIMs, the method comprising:
  receiving, by a VNFD generator executing on a computing device:
    a solution description file (SDF) encoding user input pertaining to the user-specific configuration, and
    a VNFC descriptor encoding VNFC specific information;
  validating, by the VNFD generator, the SDF and VNFC descriptor;
  converting information in the SDF and VNFC descriptor to generate an abstracted VNFD that is independent of renderers implemented at the virtualized computing environment configured in the user-specific configuration, the abstracted VNFD usable for mapping to renderers at the virtualized computing environment while abstracting details of the VNFC specific information;
  mapping the abstracted VNFD to the renderers at the virtualized computing environment to generate a VNFD that is specific to the renderers and VIM and VNFD-specific information at the virtualized computing environment configured in the user-specific configuration; and
  outputting the VNFD to the virtualized computing environment.

Clause 2: The method of clause 1, wherein the SDF is indicative of a security rules, virtual network configuration, network interface configuration, or whether to deploy a product in its paired or standalone variant.

Clause 3: The method of any of clauses 1-2, wherein the renderers include one or more of terraform, Heat, Cloudify, or Ansible.

Clause 4: The method of any of clauses 1-3, wherein the VNFC descriptor includes a product schema and a product data file.

Clause 5: The method of any of clauses 1-4, wherein the VNFD generator is extendable to new VNFCs Clause 6: The method of any of clauses 1-5, wherein the VNFD generator is extendable to new VIMs or new VNFD-types.

Clause 7: The method of clauses 1-6, wherein the SDF is a declarative YAML file that encapsulates information for configuring a specific deployment.

Clause 8: The method of any of clauses 1-7, wherein the validating is performed against a YANG schema.

Clause 9: A system comprising:
  one or more processors; and
  a memory in communication with the one or more processors, the memory having computer-readable instructions stored thereupon that, when executed by the one or more processors, cause the system to execute a VNFD generator configured to generate a virtualized network function (VNF) descriptor (VNFD) indicative of resources for managing VNF components (VNFCs) across a plurality of virtualized infrastructure managers (VIMs) implemented in a virtualized computing environment configured in a user-specific configuration, the VNF implemented by a plurality of VNFCs executing in a plurality of virtual machines managed by the VIMs, the VNFD generator further configured to:
  access a solution description file (SDF) encoding user input pertaining to the user-specific configuration;
  access a VNFC descriptor encoding VNFC specific Information;
  validate the SDF and VNFC descriptor;
  translate the SDF and VNFC descriptor to generate an abstracted VNFD that is independent of renderers implemented at the virtualized computing environment configured in the user-specific configuration; and
  translate the abstracted VNFD to a VNFD that is specific to the renderers and VIM and VNFD-specific information at the virtualized computing environment configured in the user-specific configuration.

Clause 10: The system of clause 9, wherein the VNFC descriptor includes a product schema.

Clause 11: The system of any of clauses 9 and 10, wherein the VNFC descriptor includes a product data file.

Clause 12: The system of any clauses 9-11, wherein the SDF is indicative of a security rules, virtual network configuration, network interface configuration, or whether to deploy a product in its paired or standalone variant.

Clause 13: The system of any clauses 9-12, wherein the renderers include one or more of terraform, Heat, Cloudify, or Ansible.

Clause 14: The system of any clauses 9-13, wherein the VNFD generator is extendable to new VNFCs.

Clause 15: The system of any clauses 9-14, wherein the VNFD generator is extendable to new VIMs or new VNFD-types.

Clause 16: The system of any clauses 9-14, wherein the SDF is a declarative YAML file that encapsulates information for configuring a specific deployment.

Clause 17: A computer-readable storage medium having computer-executable instructions stored thereupon which, when executed by one or more processors of a system, cause the system to:
 instantiate a VNFD generator configured to generate a virtualized network function (VNF) descriptor (VNFD) indicative of resources for managing VNF components (VNFCs) across a plurality of virtualized infrastructure managers (VIMs) implemented in a 5G network configured in a user-specific configuration, the VNF implemented by a plurality of VNFCs executing in a plurality of virtual machines managed by the VIMs, the VNFD generator further configured to:
 access a solution description file (SDF) encoding user input pertaining to the user-specific configuration;
 access a VNFC descriptor encoding VNFC specific Information;
 validate the SDF and VNFC descriptor;
 translate the SDF and VNFC descriptor to generate an abstracted VNFD that is independent of renderers implemented at the 5G environment configured in the user-specific configuration; and
 translate the abstracted VNFD to a VNFD that is specific to the renderers and VIM and VNFD-specific information at the 5G environment configured in the user-specific configuration.

Clause 18: The computer-readable storage medium of clause 17, wherein the SDF and VNFC descriptor are abstracted from underlying details of the user-specific configuration of the 5G network.

Clause 19: The computer-readable storage medium of any of the clauses 17-18, wherein the VNFC descriptor includes a product schema and a product data file.

Clause 20: The computer-readable storage medium of any of the clauses 17-19, wherein the VNFD generator is extendable to new VNFCs, new VIMs, or new VNFD-types.

The invention claimed is:

1. A method for generating a virtualized network function (VNF) descriptor (VNFD) indicative of resources for managing VNF components (VNFCs) across a plurality of virtualized infrastructure managers (VIMs) implemented in a virtualized computing environment configured in a user-specific configuration, the VNF implemented by a plurality of VNFCs executing in a plurality of virtual machines managed by the VIMs, the method comprising:
 receiving, by a VNFD generator executing on a computing device:
  a solution description file (SDF) encoding user input pertaining to the user-specific configuration, and
  a VNFC descriptor encoding VNFC specific information;
 validating, by the VNFD generator, the SDF and VNFC descriptor;
 converting information in the SDF and VNFC descriptor to generate an abstracted VNFD that is independent of renderers implemented at the virtualized computing environment configured in the user-specific configuration, the abstracted VNFD usable for mapping the information in the SDF and VNFC descriptor to the renderers implemented at the virtualized computing environment in lieu of a separate VNFD for each of the renderers implemented at the virtualized computing environment;
 mapping the abstracted VNFD to the renderers implemented at the virtualized computing environment to generate VNFDs that are specific to the renderers implemented at the virtualized computing environment, VIMs, and VNFD-specific information; and
 outputting the VNFDs to the virtualized computing environment.

2. The method of claim 1, wherein the SDF is indicative of a security rules, virtual network configuration, network interface configuration, or whether to deploy a product in its paired or standalone variant.

3. The method of claim 1, wherein the renderers include one or more of terraform, Heat, Cloudify, or Ansible.

4. The method of claim 1, wherein the VNFC descriptor includes a product schema and a product data file.

5. The method of claim 1, wherein the VNFD generator is extendable to new VNFCs.

6. The method of claim 1, wherein the VNFD generator is extendable to new VIMs or new VNFD-types.

7. The method of claim 1, wherein the SDF is a declarative YAML file that encapsulates information for configuring a specific deployment.

8. The method of claim 1, wherein the validating is performed against a YANG schema.

9. A system comprising:
 one or more processors; and
 a memory in communication with the one or more processors, the memory having computer-readable instructions stored thereupon that, when executed by the one or more processors, cause the system to execute a VNFD generator configured to generate a virtualized network function (VNF) descriptor (VNFD) indicative of resources for managing VNF components (VNFCs) across a plurality of virtualized infrastructure managers (VIMs) implemented in a virtualized computing environment configured in a user-specific configuration, the VNF implemented by a plurality of VNFCs executing in a plurality of virtual machines managed by the VIMs, the VNFD generator further configured to:
 access a solution description file (SDF) encoding user input pertaining to the user-specific configuration;
 access a VNFC descriptor encoding VNFC specific information;
 validate the SDF and VNFC descriptor;
 translate the SDF and VNFC descriptor to generate an abstracted VNFD that is independent of renderers implemented at the virtualized computing environment configured in the user-specific configuration, the abstracted VNFD usable for mapping the SDF and VNFC descriptor to the renderers implemented at the virtualized computing environment based on the SDF and VNFC descriptor in lieu of multiple VNFDs for the renderers implemented at the virtualized computing environment; and
 translate the abstracted VNFD to a VNFD that is specific to the renderers and VIMs and VNFD-specific information at the virtualized computing environment configured in the user-specific configuration.

10. The system of claim 9, wherein the VNFC descriptor includes a product schema.

11. The system of claim 9, wherein the VNFC descriptor includes a product data file.

12. The system of claim 9, wherein the SDF is indicative of a security rules, virtual network configuration, network interface configuration, or whether to deploy a product in its paired or standalone variant.

13. The system of claim 9, wherein the renderers include one or more of terraform, Heat, Cloudify, or Ansible.

14. The system of claim 9, wherein the VNFD generator is extendable to new VNFCs.

15. The system of claim 9, wherein the VNFD generator is extendable to new VIMs or new VNFD-types.

16. The system of claim 15, wherein the SDF is a declarative YAML file that encapsulates information for configuring a specific deployment.

17. A non-transitory computer-readable storage medium having computer-executable instructions stored thereupon which, when executed by one or more processors of a system, cause the system to:

instantiate a VNFD generator configured to generate a virtualized network function (VNF) descriptor (VNFD) indicative of resources for managing VNF components (VNFCs) across a plurality of virtualized infrastructure managers (VIMs) implemented in a 5G network configured in a user-specific configuration, the VNF implemented by a plurality of VNFCs executing in a plurality of virtual machines managed by the VIMs, the VNFD generator further configured to:

access a solution description file (SDF) encoding user input pertaining to the user-specific configuration;

access a VNFC descriptor encoding VNFC specific Information;

validate the SDF and VNFC descriptor;

translate the SDF and VNFC descriptor to generate a single abstracted VNFD that is independent of specific renderers implemented at the 5G network configured in the user-specific configuration, the abstracted VNFD usable for mapping the SDF and VNFC descriptor to the specific renderers implemented at the 5G network in lieu of a separate VNFD for each of the specific renderers implemented at the 5G network; and translate the abstracted VNFD to a VNFD that is specific to the renderers and VIMs and VNFD-specific information at the 5G network configured in the user-specific configuration.

18. The non-transitory computer-readable storage medium of claim 17, wherein the SDF and VNFC descriptor are abstracted from underlying details of the user-specific configuration of the 5G network.

19. The non-transitory computer-readable storage medium of claim 17, wherein the VNFC descriptor includes a product schema and a product_data file.

20. The non-transitory computer-readable storage medium of claim 17, wherein the VNFD generator is extendable to new VNFCs, new VIMs, or new VNFD-types.

* * * * *